(12) United States Patent
Tanaka et al.

(10) Patent No.: US 9,325,874 B2
(45) Date of Patent: Apr. 26, 2016

(54) LIGHT GUIDE, ILLUMINATING DEVICE AND IMAGE READING APPARATUS

(71) Applicant: KONICA MINOLTA, INC., Chiyoda-ku, Tokyo (JP)

(72) Inventors: Satoko Tanaka, Toyokawa (JP); Masahiko Tanaka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/814,667

(22) Filed: Jul. 31, 2015

(65) Prior Publication Data

US 2016/0057308 A1 Feb. 25, 2016

(30) Foreign Application Priority Data

Aug. 20, 2014 (JP) ................................. 2014-167650

(51) Int. Cl.
| | |
|---|---|
| *H04N 1/04* | (2006.01) |
| *H04N 1/028* | (2006.01) |
| *F21V 8/00* | (2006.01) |

(52) U.S. Cl.
CPC .......... *H04N 1/02835* (2013.01); *G02B 6/0053* (2013.01); *H04N 2201/0081* (2013.01); *H04N 2201/02462* (2013.01)

(58) Field of Classification Search
CPC ........... F21V 5/02; F21V 13/02; F21V 5/005; F21V 2200/15; F21V 29/20; F21V 33/0052; F21V 33/0096; F21V 3/02; F21V 3/049; F21V 9/00; F21V 9/14; H04N 13/0418; H04N 13/0409; H04N 13/0411; H04N 13/04
USPC ................... 362/298, 343; 250/423 R, 578.1; 358/475
See application file for complete search history.

(56) References Cited

U.S. PATENT DOCUMENTS

| | | | | |
|---|---|---|---|---|
| 5,771,328 A | * | 6/1998 | Wortman | F21V 5/02 349/62 |
| 9,244,329 B2 | * | 1/2016 | Shikii | G02F 1/29 |
| 2006/0291243 A1 | * | 12/2006 | Niioka | G02B 3/08 362/607 |
| 2012/0306981 A1 | * | 12/2012 | Kawasaki | G03G 15/0435 347/118 |
| 2014/0160574 A1 | * | 6/2014 | Ju | G02B 5/04 359/625 |
| 2014/0313738 A1 | * | 10/2014 | Tanaka | G02B 6/001 362/298 |
| 2014/0376217 A1 | * | 12/2014 | Yamada | F21K 9/52 362/217.02 |
| 2015/0207954 A1 | * | 7/2015 | Sugiyama | H04N 1/02895 358/475 |

FOREIGN PATENT DOCUMENTS

JP 2000-028829 A 1/2000

* cited by examiner

*Primary Examiner* — Negussie Worku
(74) *Attorney, Agent, or Firm* — Buchanan Ingersoll & Rooney PC

(57) ABSTRACT

A light guide has a guide portion extending in a first direction. Light entering the guide portion through a first end is guided to a reading position. The guide portion has prisms provided on a bottom surface to be arranged in the first direction, and a turn-back member configured to turn light coming to a second end of the guide portion back toward the first end. Each of the prisms includes a first total-reflecting surface facing to the first end and a second total-reflecting surface facing to the second end. With respect to at least one of the prisms located within an area extending parallel to the first direction from the second end toward the first end by a predetermined distance, the angle of the first total-reflecting surface to the bottom surface is greater than the angle of the second total-reflecting surface to the bottom surface.

18 Claims, 10 Drawing Sheets

F I G . 1
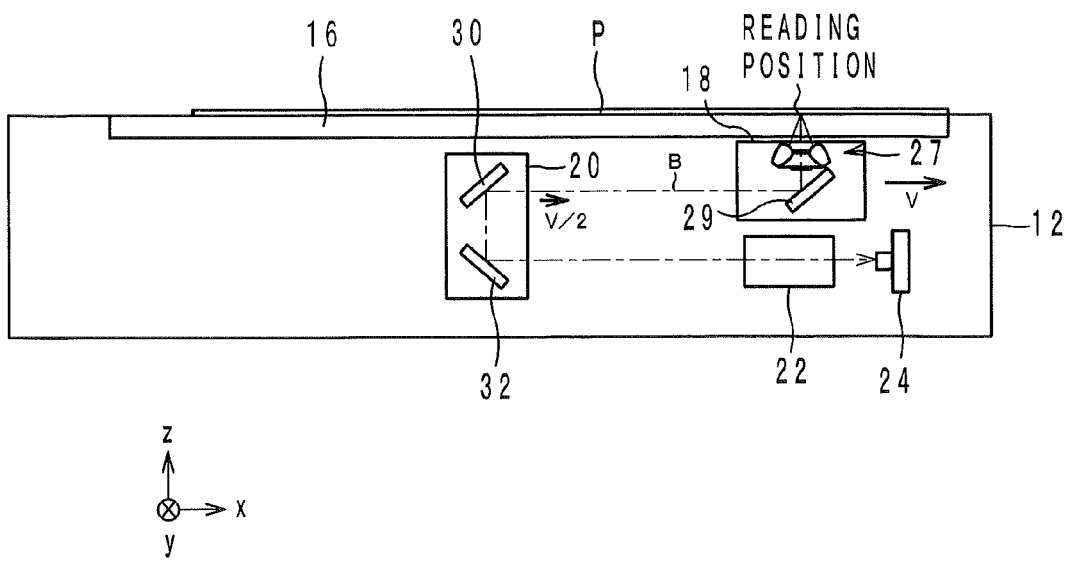

F I G . 2
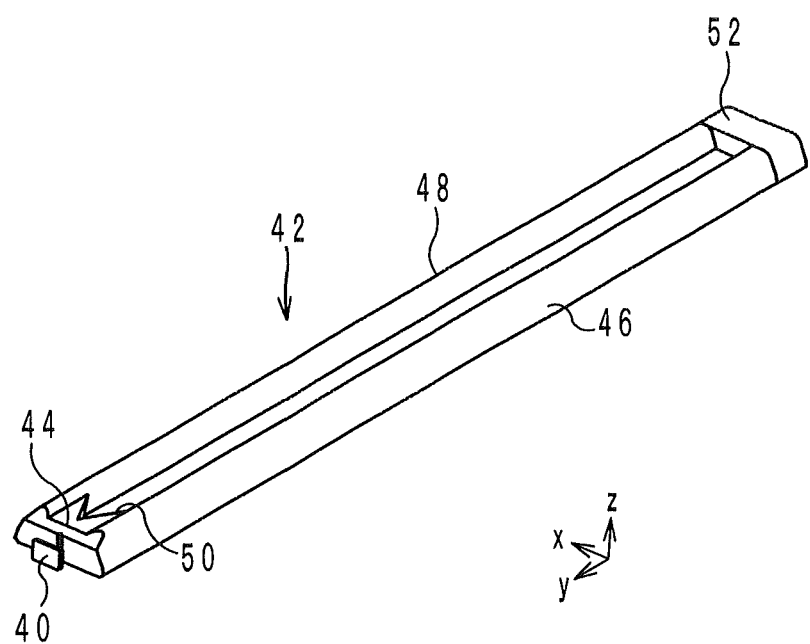

F I G . 4
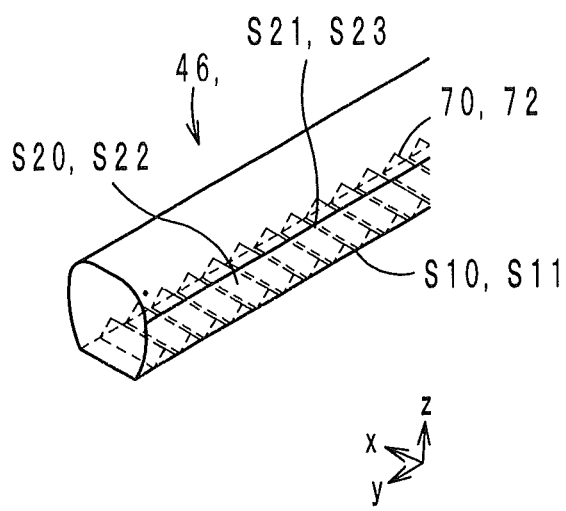

FIG. 5
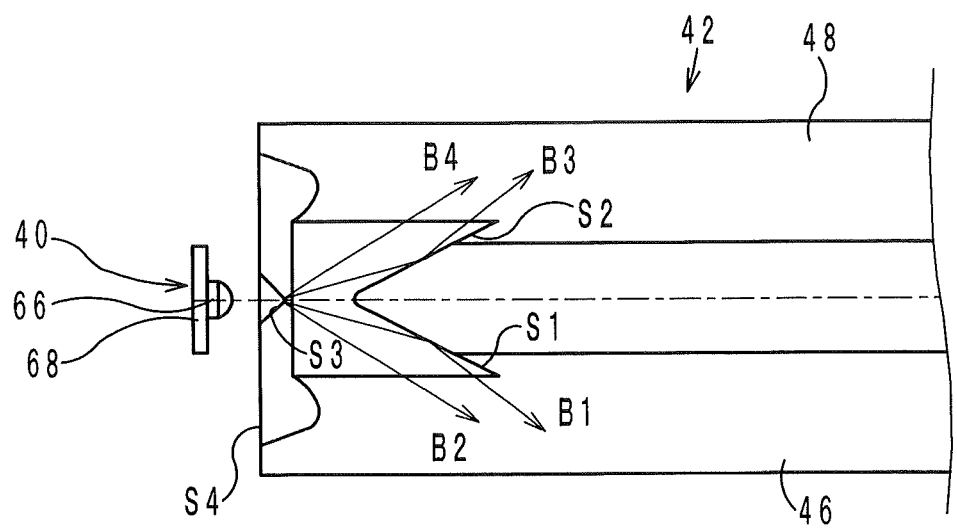
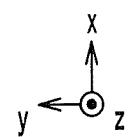

F I G. 9
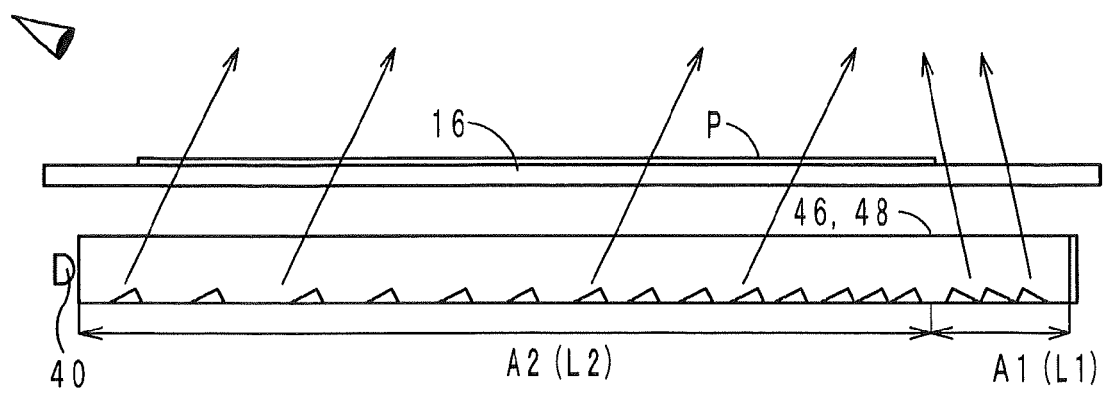
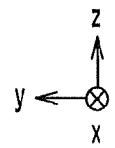

LIGHT GUIDE, ILLUMINATING DEVICE AND IMAGE READING APPARATUS

This application claims benefit of priority to Japanese Patent Application No. 2014-167650 filed Aug. 20, 2014, the content of which is incorporated herein by reference.

BACKGROUND OF THE INVENTION

Field of the Invention

The present invention relates to a light guide, an illuminating device and an image reading apparatus, and more particularly to a light guide, an illuminating device and an image reading apparatus that illuminate a document.

As an example of inventions relating to light guides, an illuminating device disclosed in Japanese Patent Laid-Open Publication No. 2000-28829 is well known. The illuminating device comprises a light guide, a light source and a reflecting surface. The light guide is shaped like a rod extending in a predetermined direction. At the bottom of the light guide, prisms are provided. The light source is located by the side of a first end of the light guide. Light emitted from the light source enters the light guide through the first end. The light after entering the light guide travels toward a second end of the light guide while being total-reflected repeatedly in the light guide. While traveling in the light guide toward the second end, the light is also reflected by the prisms, and a part of the light exits from the light guide to a reading position of an image reading apparatus for which the illuminating device is provided. The reflecting surface is provided at the second end of the light guide and is configured to reflect the light coming thereto toward the first end of the light guide. Accordingly, light leakage from the light guide through the second end is reduced.

In the illuminating device disclosed in Japanese Patent Laid-Open Publication No. 2000-28829, the light reflected by the reflecting surface is total-reflected by the prism near the second end of the light guide. However, the prism near the second end is designed to total-reflect the light traveling in the light guide toward the second end to the reading position of the image reading apparatus, and the light reflected by the reflecting surface, which travels in the light guide toward the first end, is unlikely to be total-reflected to the reading position. Consequently, the light reflected by the reflecting surface is not used efficiently.

SUMMARY OF THE INVENTION

An object of the present invention is to provide a light guide, an illuminating device and an image reading apparatus that are capable of making more efficient use of light.

According to a first embodiment of the present invention, a light guide comprises:

a first guide portion extending in a first direction and configured to guide light entering thereto through a first end at a first side in the first direction to a reading position, the first guide portion including: a plurality of first prisms provided on a first bottom surface of the first guide portion to be arranged in the first direction, the first bottom surface extending in the first direction, and configured to total-reflect light traveling in the first guide portion to the reading position; and a turn-back member configured to turn light coming to a second end of the first guide portion back in the first direction toward the first end, the second end located at a second side that is an opposite side in the first direction to the first side, wherein:

each of the first prisms includes a first total-reflecting surface facing to the first side in the first direction and a second total-reflecting surface facing to the second side in the first direction; and with respect to at least one of the first prisms located within an area extending parallel to the first direction from the second end of the first guide portion toward the first end by a first predetermined distance, an angle of the first total-reflecting surface to the first bottom surface is greater than an angle of the second total-reflecting surface to the first bottom surface.

According to a second embodiment of the present invention, a light guide comprises:

a first guide portion extending in a first direction and configured to guide light entering thereto through a first end thereof located at a first side in the first direction to a reading position, the first guide portion including a plurality of first prisms provided on a first bottom surface of the first guide portion to be arranged in the first direction, the first bottom surface extending in the first direction, and configured to total-reflect light traveling in the first guide portion to the reading position; a second guide portion extending in the first direction and configured to guide light entering thereto through a third end thereof located at the first side in the first direction to the reading position, the second guide portion including a plurality of second prisms provided on a second bottom surface of the second guide portion to be arranged in the first direction, the second bottom surface extending in the first direction, and configured to total-reflect light traveling in the second guide portion to the reading position; and a turn-back member configured to guide light coming to a second end of the first guide portion to a fourth end of the second guide portion and to guide light coming to the fourth end of the second guide portion to the second end of the first guide portion, the second end and the fourth end located at a second side that is an opposite side in the first direction to the first side, wherein:

each of the first prisms includes a first total-reflecting surface facing to the first side in the first direction and a second total-reflecting surface facing to the second side in the first direction; and with respect to at least one of the first prisms located within an area extending parallel to the first direction from the second end of the first guide portion toward the first end by a first predetermined distance, an angle of the first total-reflecting surface to the first bottom surface is greater than an angle of the second total-reflecting surface to the first bottom surface.

BRIEF DESCRIPTION OF THE DRAWINGS

FIG. 1 is a configuration diagram of an image reading apparatus 10 comprising an illuminating device 27 according to an embodiment of the present invention.

FIG. 2 is a perspective view of the illuminating device 27.

FIG. 4 is a perspective view of a guide portion 46 or 48 of the light guide 42.

FIG. 5 is a plan view of the light guide 42 when viewed from a positive z-direction.

FIG. 9 is a plan view of a main part of the image reading apparatus 10 when viewed from the x-direction.

DETAILED DESCRIPTION OF THE PREFERRED EMBODIMENTS

Figure 3:
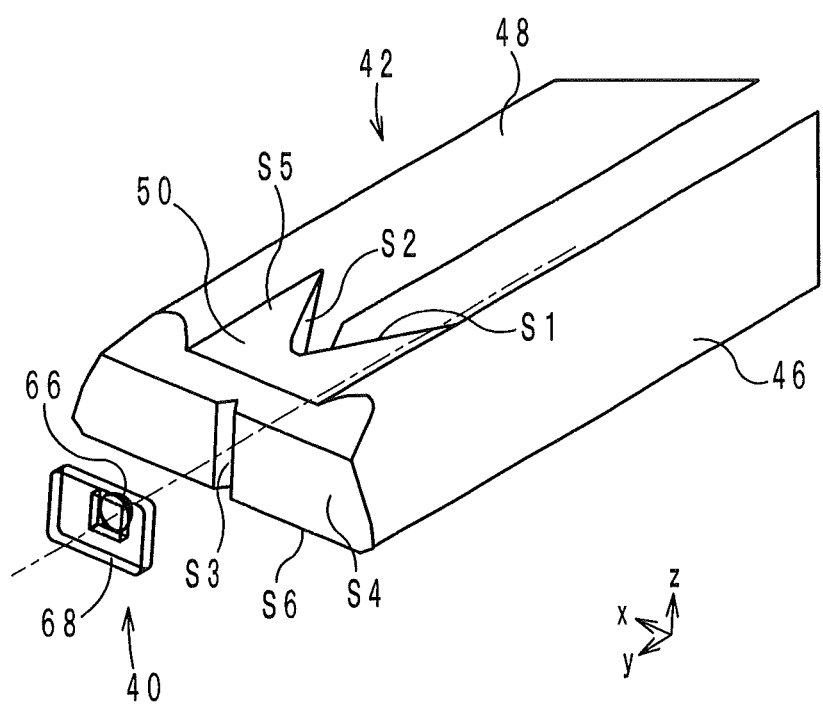
FIG. 3 is a perspective view of a light source unit 40 and a light guide 42.

An illuminating device and an image reading apparatus comprising a light guide according to an embodiment of the present invention will be described below.

Structure of Image Reading Apparatus

FIG. 1 is a configuration diagram of an image reading apparatus 10 comprising an illuminating device 27 according to an embodiment of the present invention. In the following, the vertical direction is referred to as z-direction, and the direction in which slider units 18 and 20 are movable (that is, sub-scanning direction) is referred to as x-direction. The direction orthogonal to the x-direction and the z-direction (that is, main-scanning direction) is referred to as y-direction. The x-direction, the y-direction and the z-direction are orthogonal to one another.

The image reading apparatus 10, as illustrated in FIG. 1, comprises a main body 12, a platen glass 16, slider units 18 and 20, a focusing lens 22 and an image pickup element 24.

The main body 12 is a cuboidal case, to which the platen glass 16, the slider units 18 and 20, the focusing lens 22 and the image pick-up element 24 are attached. The platen glass 16 is a rectangular transparent plate fitted in an opening formed in a positive side in the z-direction of the main body 12. A document P is placed on the upper surface of the platen glass 16 such that the side to be subjected to image reading faces to a negative side in the z-direction.

The slider unit 18 is driven by a mechanism (not shown) including a motor, a belt and a pulley, for example, to move in a positive x-direction along the document P at a speed V as illustrated in FIG. 1. As seen in FIG. 1, the slider unit 18 includes an illuminating device 27 and a mirror 29.

The illuminating device 27 emits light such that a read portion of the document P (a portion at a reading position) is illuminated from two directions, and the illuminating device 27 is, for example, a combination of an LED and a light guide. Illuminating the read portion of the document P from two directions leads to a reduction of occurrence of a shadow in the reading position. A detailed description of the illuminating device 27 will be given later. The mirror 29, as illustrated in FIG. 1, is configured to reflect light B reflected from the document P in a negative x-direction.

While the document P is subjected to image reading, as illustrated in FIG. 1, the slider unit 20 is driven by a mechanism including a motor, a belt and a pulley, for example, to move in the positive x-direction at a speed of V/2. The slider unit 20 includes mirrors 30 and 32.

The mirror 30 reflects the light B reflected by the mirror 29 in a negative z-direction. The mirror 32 reflects the light B reflected by the mirror 30 in the positive x-direction.

The focusing lens 22 focuses an optical image obtained by the light B on the image pickup element 24. The image pickup element 24 is a light-receiving element that receives the light B reflected by the mirror 32. Specifically, the image pickup element 24 has an image pickup area extending linearly in the y-direction. Thus, the image pickup element 24 is a line sensor, for example, a CCD camera, which reads an image of the document P by scanning the optical image focused thereon by the focusing lens 22.

When a user uses the image reading apparatus 10, the user stands at a positive side in the y-direction of the image reading apparatus 10.

Structure of Illuminating Device

The structure of the illuminating device 27 will be described below with reference to the drawings. FIG. 2 is a perspective view of the illuminating device 27. FIG. 3 is a perspective view of a light source unit 40 and a light guide 42. FIG. 4 is a perspective view of guide portions 46 and 48 of the light guide 42. FIG. 5 is a plan view of the light guide 42 when viewed from the positive side in the z-direction.

As illustrated in FIGS. 2 and 3, the illuminating device 27 comprises a light source unit 40 and a light guide 42.

As illustrated in FIGS. 2 and 3, the light guide 42 includes guide portions 46 and 48, and connecting portions 50 and 52. Light emergent from the light guide 42 illuminates the read portion of the document P, which is placed to extend in the y-direction, from two directions. Thereby, the image reading apparatus 10 is capable of reading a shadowless image. The reading position is located farther in the positive z-direction than the light guide 42. More specifically, the reading position is located at the positive side in the z-direction of the middle point between the guide portions 46 and 48.

The guide portion 46 is a rod-like transparent member extending in the y-direction and having a substantially constant diameter. The guide portion 46 takes in light through the positive end in the y-direction thereof and emits light toward the reading position, and more specifically, emits light in the positive x-direction and the positive z-direction. The guide portion 48 is a rod-like transparent member extending in the y-direction and having a substantially constant diameter. The guide portion 48 is located at the positive side in the x-direction of the guide portion 46. The guide portion 46 takes in light through the positive end in the y-direction thereof and emits light toward the reading position, and more specifically, emits light in the negative x-direction and the positive z-direction. When viewed from the z-direction, the guide portion 46 and the guide portion 48 are line-symmetrical to each other with respect to a line passing the middle point in the x-direction between the guide portions 46 and 48 and extending in the y-direction.

As illustrated in FIG. 4, the surfaces of the light guides 46 and 48 at the negative end in the z-direction are referred to as a bottom surface S10 and a bottom surface S11, respectively. The bottom surfaces S10 and S11 extend in the y-direction along the guide portions 46 and 48, respectively. Prisms 70 are provided on the bottom surface S10 so as to be arranged in the y-direction, and prisms 72 are provided on the bottom surface S11 so as to be arranged in the y-direction. Each of the prisms 70 is triangular when viewed from the x-direction, and has a total-reflecting surface S20 facing to the positive side in the y-direction and a total-reflecting surface S21 facing to the negative side in the y-direction. Each of the prisms 72 is triangular when viewed from the x-direction, and has a total-reflecting surface S22 facing to the positive side in the y-direction and a total-reflecting surface S23 facing to the negative side in the y-direction. The total-reflecting surfaces S20 through S23 are resin-air interfaces where total reflection of light occurs due to a difference in refraction index between resin and air. The side which each of the total-reflecting surfaces S20 through S23 faces to means the direction in which the normal line to the resin-air interface extends toward the resin.

As seen in FIG. 3, the connecting portion 50 connects the respective positive ends in the y-direction of the guide portions 46 and 48 to each other. As seen in FIGS. 3 and 5, the connecting portion 50 has reflecting surfaces S1 and S2, an entrance surface S3, a holding surface S4, a top surface S5 and a bottom surface S6.

The holding surface S4 is a surface facing to the light source unit 40 and a surface at the positive side in the y-direction of the connecting portion 50. The entrance surface S3 is an inner surface of a groove having a triangular cross section and extending in the z-direction, and the groove can be formed by notching the holding surface S4, in the center in the x-direction. The reflecting surfaces and S2 are located farther in the negative y-direction than the holding surface S4, and the reflecting surfaces S1 and S2 are arranged in this order from the negative side to the positive side in the x-direction. The reflecting surface S1 faces to the positive side in the x-direction and the negative side in the y-direction. The reflecting surface S2 faces to the negative side in the x-direction and the negative side in the y-direction. Accordingly, the reflecting surfaces S1 and S2 form into a V shape when viewed from the z-direction. When viewed from the z-direction, also, the reflecting surfaces S1 and S2 are line-symmetrical to each other with respect to a line passing the middle point in the x-direction of the connecting portion 50 and extending in the y-direction.

The top surface S5 is a surface connecting the holding surface S4 to the reflecting surfaces S1 and S2, and is a surface at the positive side in the z-direction of the connecting portion 50. The bottom surface S6 is a surface connecting the holding surface S4 to the reflecting surface S1 and S2, and is a surface at the negative side in the z-direction of the connecting portion 50. Accordingly, the top surface S5 and the bottom surface S6 are opposed to each other, and the top surface S5 is located farther in the positive z-direction than the bottom surface S6.

As seen in FIG. 2, the connecting portion 52 connects the respective negative ends in the y-direction of the guide portions 46 and 48 to each other. The connecting portion 52 functions as a turn-back member that guides the light coming to the negative end in the y-direction of the guide portion 46 to the negative end in the y-direction of the guide portion 48 by total reflection and guides the light coming to the negative end in the y-direction of the guide portion 48 to the negative end in the y-direction of the guide portion 46 by total reflection. The guide portions 46 and 48 and the connecting portions 50 and 52 are made of, for example, resin of polymethylmethacrylate.

The light source unit 40, as seen in FIG. 5, includes a light source 66 and a circuit board 68. The circuit board 68 is a rectangular plate including a drive circuit for the light source 66. The circuit board 68 is opposed to the holding surface S4.

The light source 66 is, for example, an LED, and is located on a main surface at the negative side in the y-direction of the circuit board 68. The light source 66 emits light in the negative y-direction, in the positive and the negative z-directions and in the positive and the negative x-directions. In this embodiment, the light source 66 has a half-value angle of about 120 degrees around the y-axis. The half-value angle means the angle of observation at which the luminance is 50% of the luminance of the diffused light in the center (at an angle of 0 degrees). As illustrated in FIG. 5, light emitted from the light source 66 enters the connecting portion 50 through the entrance surface S3.

Next, the optical path in the illuminating device 27 is described with reference to FIG. 5.

The light source 66 emits light. The light emitted from the light source 66 passes through the entrance surface S3 and enters the connecting portion 50. A part of the light that has entered the connecting portion 50 through the entrance surface S3 is incident to the reflecting surface S1. This part of the light is denoted by B1 in FIG. 5. The light B1 is total-reflected by the reflecting surface S1 and enters the guide portion 46. A part of the light that has entered the connecting portion 50 through the entrance surface S3 enters the guide portion 46 directly without being incident to the reflecting surface S1. This part of the light is denoted by B2 in FIG. 5.

The light B1 and the light B2 that have entered the guide portion 46 travel in the negative y-direction while being total-reflected repeatedly inside the guide portion 46. In this regard, the light B1 and the light B2 are total-reflected by the prisms 70 provided in the guide portion 46 while traveling in the y-direction. Accordingly, the light B1 and the light B2 emerge from the guide portion 46 in the positive z-direction.

A part of the light that has entered the connecting portion 50 through the entrance surface S3 is incident to the reflecting surface S2. This part of the light is denoted by B3 in FIG. 5. The light B3 is total-reflected by the reflecting surface S2 and enters the guide portion 48. A part of the light that has entered the connecting portion 50 through the entrance surface S3 enters the guide portion 48 directly without being incident to the reflecting surface S2. This part of the light is denoted by B4 in FIG. 5.

The light B3 and the light B4 that have entered the guide portion 48 travel in the negative y-direction while being total-reflected repeatedly inside the guide portion 48. In this regard, the light B3 and the light B4 are total-reflected by the prisms 72 provided in the guide portion 48 while traveling in the y-direction. Accordingly, the light B3 and the light B4 emerge from the guide portion 48 in the positive z-direction.

Figure 6:
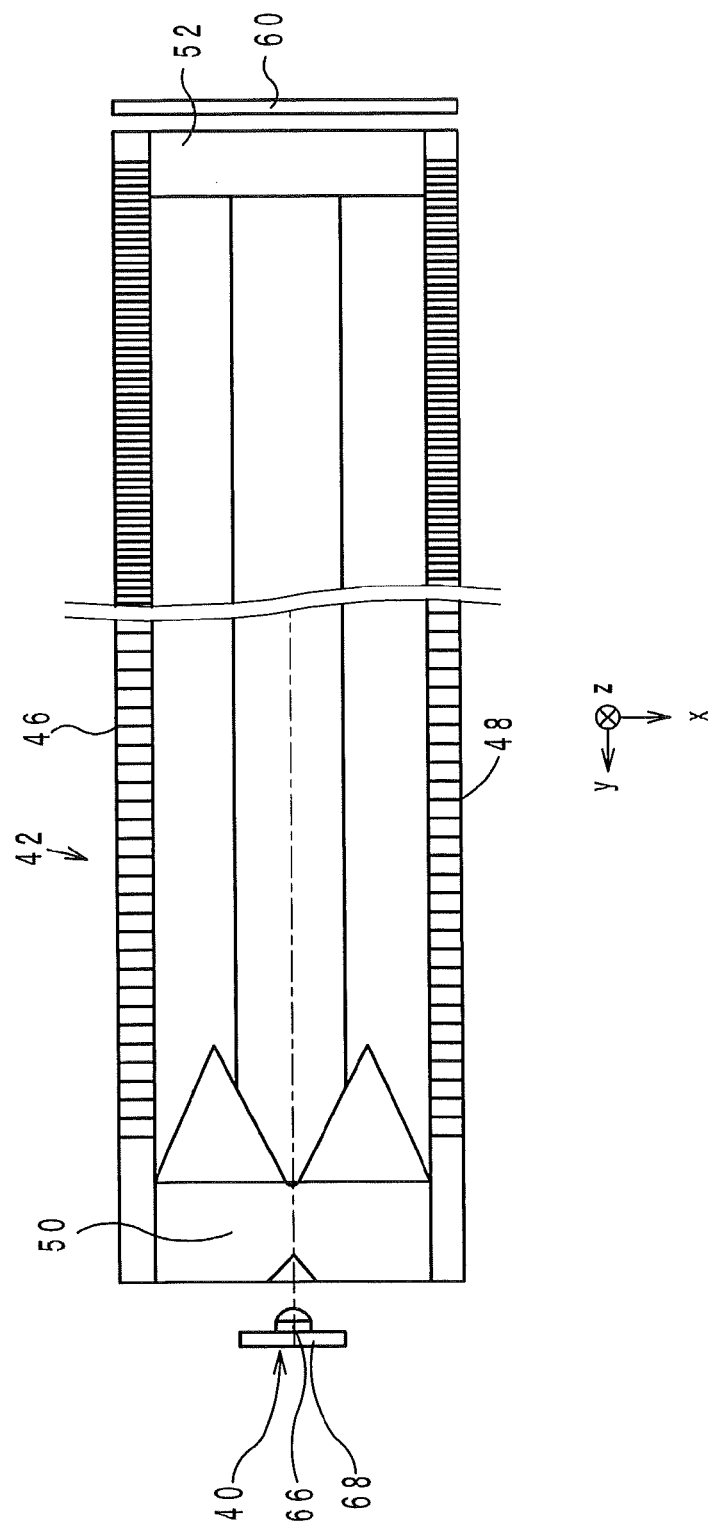
FIG. 6 is a plan view of the light guide 42 when viewed from a negative z-direction.
Figure 7:
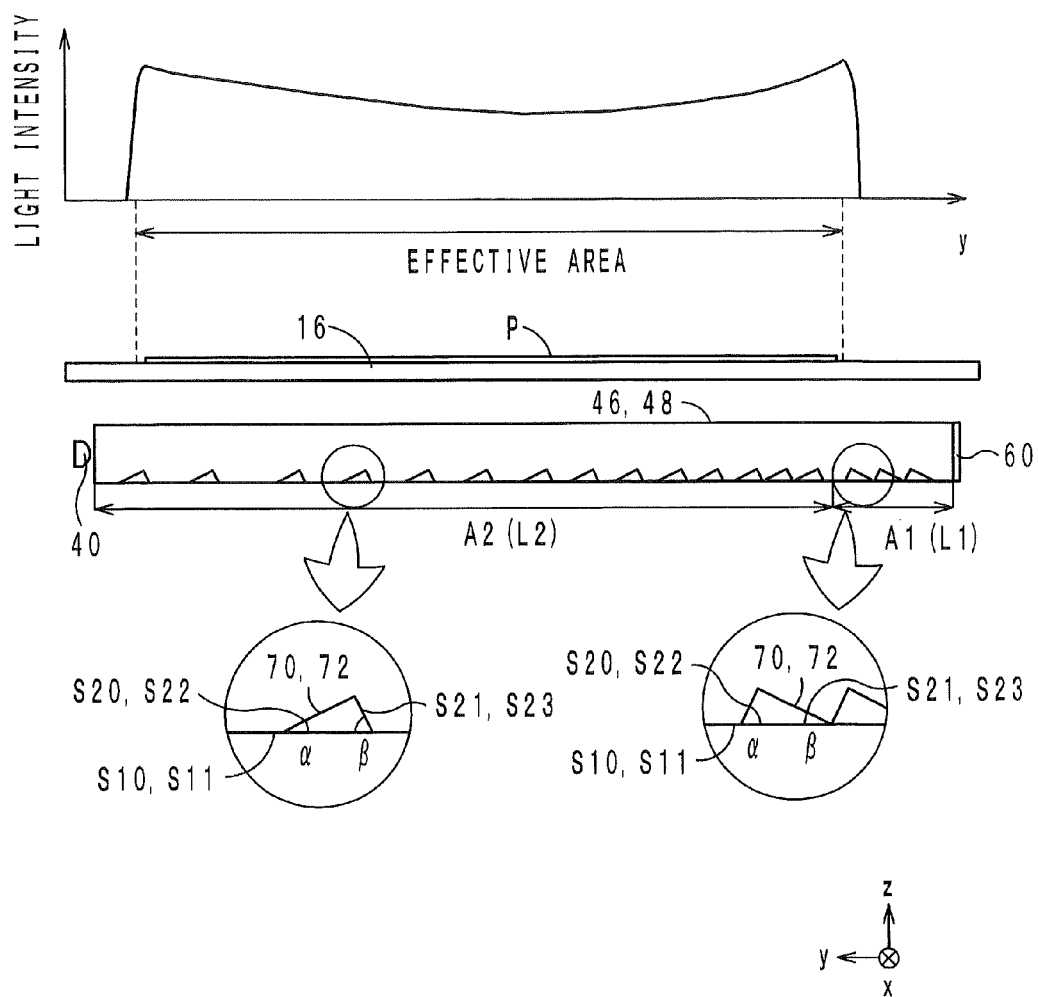
FIG. 7 includes a plan view of the light guide when viewed from an x-direction and a graph indicating an intensity distribution of light emergent from the light guide 42.
Figure 8A:
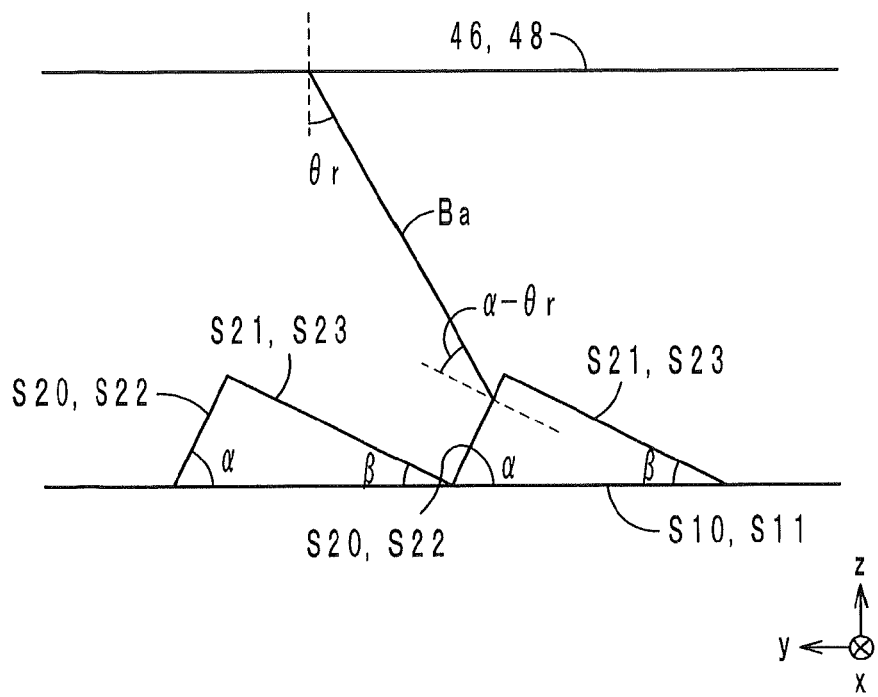
FIG. 8A is an enlarged view of prisms 70.
Figure 8B:
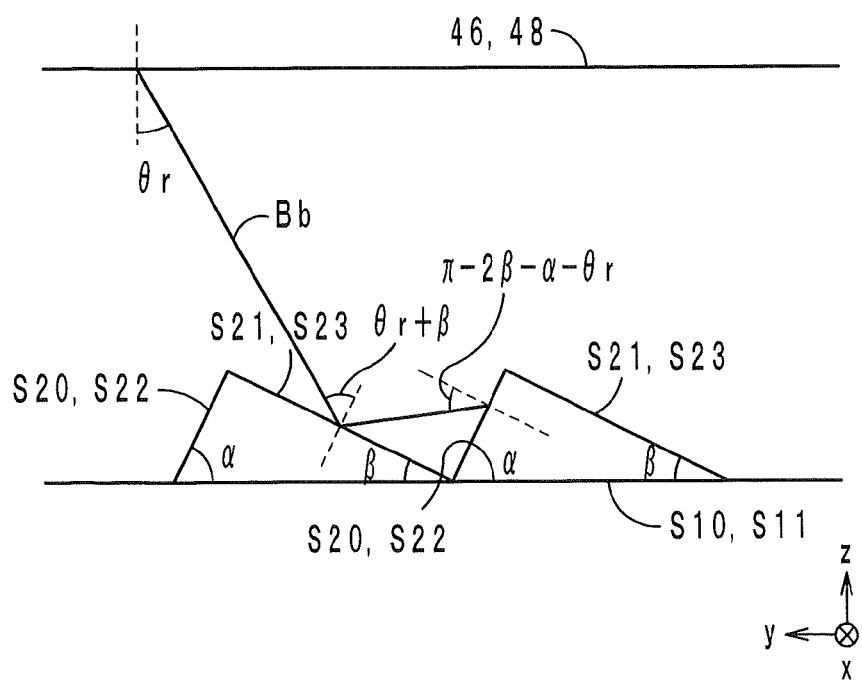
FIG. 8B is an enlarged view of the prisms 70.

The light guide 42, as described below, has such a structure to permit efficient use of light. FIG. 6 is a plan view of the light guide 42 when viewed from the negative z-direction. FIG. 7 includes a plan view of the light guide 42 when viewed from the x-direction and a graph indicating a light intensity distribution of light emerging from the guide portion 42. FIGS. 8A and 8B are enlarged views of the prisms 70.

As illustrated in FIGS. 6 and 7, the light guide 42 further includes a reflector 60, which is, for example, a white sheet. The reflector 60 is opposed to the negative ends in the y-direction of the guide portions 46 and 48. In this embodiment, the reflector 60 is located farther in the negative y-direction than the connecting portion 52. The reflector 60 functions as a turn-back member that reflects the light coming to the negative end in the y-direction of the guide portion 46 to turn back the light in the positive y-direction. A part of the light reflected by the reflector 60 enters the guide portion 48 through the connecting portion 52 and travels in the positive y-direction. The reflector 60 also functions as a turn-back member that reflects the light coming to the negative end in the y-direction of the guide portion 48 to turn back the light in the positive y-direction. A part of the light reflected by the reflector 60 enters the guide portion 46 through the connecting portion 52 and travels in the positive y-direction.

As indicated in FIGS. 6 and 7, an area extending parallel to the y-direction from the negative ends in the y-direction of the guide portions 46 and 48 toward the positive ends in the y-direction of the guide portions 46 and 48 by a first distance L1 is referred to as an area A1, and an area extending parallel to the y-direction from the respective positive ends in the y-direction of the guide portions 46 and 48 toward the negative ends in the y-direction of the guide portions 46 and 48 by a second distance L2 is referred to as an area A2. The areas A1 and A2 border each other. The distance L2 is considerably greater than the distance L1.

With respect to each of the prisms 70 in the area A1, the angle α of the total-reflecting surface S20 to the bottom surface S10 is greater than the angle β of the total-reflecting surface S21 to the bottom surface S10. With respect to each of the prisms 72 in the area A1, the angle α of the total-reflecting surface S22 to the bottom surface S11 is greater than the angle β of the total-reflecting surface S23 to the bottom surface S11.

On the other hand, with respect to each of the prisms 70 in the area A2, the angle β of the total-reflecting surface S21 to the bottom surface S10 is greater than the angle α of the total-reflecting surface S20 to the bottom surface S10. With respect to each of the prisms 72 in the area A2, the angle β of the total-reflecting surface S23 to the bottom surface S11 is greater than the angle α of the total-reflecting surface S22 to the bottom surface S11.

The angles α of the prisms 70 and 72 in the area A2 are greater than the angles β of the prisms 70 and 72 in the area A1.

Now, favorable conditions of the angles α and β of the prisms 70 and 72 are described. The prisms 70 and 72 in the area A2 serve mainly to total-reflect the light traveling in the negative y-direction to the reading position. Therefore, in the area A2, it is preferred that the light incident to the total-reflecting surfaces S20 and S22 of the prisms 70 and 72 from the positive y-direction is total-reflected by the total-reflecting surfaces S20 and S22. The angles α of the prisms 70 and 72 in the area A2 are designed such that the light total-reflected by the prisms 70 and 72 in the area A2 is directed to the reading position. In the area A2, meanwhile, it is preferred that the light incident to the total-reflecting surfaces S21 and S23 of the prisms 70 and 72 from the negative y-direction passes through the total-reflecting surfaces S21 and S23.

The prisms 70 and 72 in the area A1 serve mainly to total-reflect the light traveling in the positive y-direction to the reading position. Therefore, in the area A1, it is preferred that the light incident to the total-reflecting surfaces S21 and S23 of the prisms 70 and 72 from the negative y-direction is total-reflected by the total-reflecting surfaces S21 and S23. The angles β of the prisms 70 and 72 in the area A1 are designed such that the light total-reflected by the prisms 70 and 72 in the area A1 is directed to the reading position. In the area A1, meanwhile, it is preferred that the light incident to the total-reflecting surfaces S20 and S22 of the prisms 70 and 72 from the positive y-direction passes through the total-reflecting surfaces S20 and S22.

The prisms 70 and 72 in the area A1 fulfill the following condition (1) such that the light incident to the total-reflecting surfaces S20 and S22 from the positive y-direction passes through the total-reflecting surfaces S20 and S22.

$$2(\pi/2-\theta r-\beta) \leq \alpha \leq 2\theta r \quad (1)$$

θr: critical angle of the material of the guide portions 46 and 48

α: angles of the total-reflecting surfaces S20 and S22 to the bottom surfaces S10 and S11

β: angles of the total-reflecting surfaces S21 and S23 to the bottom surfaces S10 and S11

Referring to FIGS. 8A and 8B, the condition expression (1) is described. First, light directly incident to the reflecting surfaces S20 and light directly incident to the reflecting surfaces S22 are discussed. In each of the guide portions 46 and 48, as illustrated in FIG. 8A, a ray incident to each of the total-reflecting surfaces S20 or S22 at the greatest incident angle of all of the rays reflected internally by the surface at the positive side in the z-direction of the guide portion 46 or 48 and incident to the same total-reflecting surface S20 or S22 is a ray Ba reflected internally by the surface at the positive side in the z-direction of the guide portion 46 or 48 at a reflection angle of θr. If the ray Ba passes through the light-reflecting surface S20 or S22, all of the rays reflected by the surface at the positive side in the z-direction of the guide portion 46 or 48 pass through the total-reflecting surface S20 or S22. The incident angle of the ray Ba to each of the total-reflecting surfaces S20 or S22 is α−θr. Therefore, if the following condition (2) is fulfilled, the ray Ba is not total-reflected by the total-reflecting surface S20 or S22 and passes through the total-reflecting surface S20 or S22.

$$\alpha-\theta r \leq \theta r \quad (2)$$

Next, light incident to the reflecting surfaces S20 after being reflected by the total-reflecting surfaces S21 and light incident to the reflecting surfaces S22 after being reflected by the total-reflecting surfaces S23 are discussed. In each of the guide portions 46 and 48, as illustrated in FIG. 8B, a ray incident to each of the total-reflecting surfaces S21 or S23 at the smallest incident angle of all of the rays reflected internally by the surface at the positive side in the z-direction of the guide portion 46 or 48 is a ray Bb reflected internally by the surface at the positive side in the z-direction of the guide portion 46 or 48 at a reflection angle of θr. The ray Bb is total-reflected by the total-reflecting surface S21 or S23 and is incident to the total-reflecting surface S20 or S22. The ray Bb is incident to the total-reflecting surface S20 or S22 at the smallest incident angle of all of the rays total-reflected by the same total-reflecting surface S21 or S23 and incident to the same total-reflecting surface S20 or S22. Therefore, if the ray Bb passes through the total-reflecting surface S20 or S22, all of the rays total-reflected by the total-reflecting surface S21 or S23 passes through the total-reflecting surface S20 or S22. The incident angle of the ray Bb to the total-reflecting surface S21 or S23 is θr+β. The incident angle of the ray Bb to the total-reflecting surface S20 or S22 is π−2β−α−θr. Therefore, if the following condition (3) is fulfilled, the ray Bb is not total-reflected by the total-reflecting surface S20 or S22 and passes through the total-reflecting surfaces S20 or S22.

$$\pi-2\beta-\alpha-\theta r \leq \theta r \quad (3)$$

From the condition expressions (2) and (3), the condition expression (1) is derived.

For the same reason as described above, the prisms 70 and 72 in the area A2 fulfill the following condition (4) such that the light incident to the total-reflecting surfaces S21 and S23 from the negative x-direction passes through the total-reflecting surfaces S21 and S23.

$$2(\pi/2-\theta r-\alpha) \leq \beta \leq 2\theta r \quad (4)$$

In a case where a document P having a width (size in the y-direction) of a readable maximum size is set on the platen glass 16, as seen in FIG. 7, the prisms 70 and 72 in the area A1 do not overlap with the document P when viewed from a normal direction of the document P (that is, from the z-direction). Thus, when viewed from the z-direction, the prisms 70 and 72 in the area A1 are located farther in the negative y-direction than the document P set on the platen glass 16.

Advantageous Effects

With the light guide 42 according to this embodiment, it is possible to use light efficiently. Specifically, the reflector 60 functions as a turn-back member that reflects the light that has reached the negative ends in the y-direction of the guide portions 46 and 48 to turn back the light in the positive y-direction. Also, the connecting portion 52 functions as a turn-back member that guides the light that has reached the negative end in the y-direction of the guide portion 46 to the negative end in the y-direction of the guide portion 48 by total reflection and guides the light that has reached the negative end in the y-direction of the guide portion 48 to the negative end in the y-direction of the guide portion 46 by total reflection. Accordingly, the light that has reached to the negative ends in the y-direction of the guide portions 46 and 48 is prevented from leaking therefrom, and efficient use of light is possible.

With respect to each of the prisms 70 in the area A1, the angle α of the total-reflecting surface S20 to the bottom surface S10 is greater than the angle β of the total-reflecting surface S21 to the bottom surface S10. With respect to each of the prisms 72 in the area A1, the angle α of the total-reflecting surface S22 to the bottom surface S11 is greater than the angle β of the total-reflecting surface S23 to the bottom surface S11. Thereby, the light reflected by the reflector 60 and the light guided to the negative ends in the y-direction of the guide portions 46 and 48 by the connecting portion 52 are total-reflected to the reading position by the total-reflecting surfaces S21 and S23. Consequently, in the light guide 42, light is used efficiently.

Also, for the reason described below, the light guide 42 permits efficient use of light. In the area A2, light incident to the total-reflecting surfaces S20 of the prisms 70 from the positive y-direction and light incident to the total-reflecting surfaces S22 of the prisms 72 from the positive y-direction are total-reflected by the total-reflecting surfaces S20 and S22, respectively, and light incident to the total-reflecting surfaces S21 of the prisms 70 from the negative y-direction and light incident to the total-reflecting surfaces S23 of the prisms 72 from the negative y-direction pass through the total-reflecting surfaces S21 and S23, respectively. Thus, in the area A2 of each of the guide portions 46 and 48, the light traveling in the negative y-direction is total-reflected to the reading position by the total-reflecting surfaces S20 or S22 while traveling in the negative y-direction.

In the area A1, light incident to the total-reflecting surfaces S20 of the prisms 70 from the positive y-direction and light incident to the total-reflecting surfaces S22 of the prisms 72 from the positive y-direction pass through the total-reflecting surfaces S20 and S22, respectively, and light incident to the total-reflecting surfaces S21 of the prisms 70 from the negative y-direction and light incident to the total-reflecting surfaces S23 of the prisms 72 from the negative y-direction are total-reflected by the total-reflecting surfaces S21 and S23, respectively. Accordingly, in each the guide portions 46 and 48, light coming to the area A1 through the area A2 passes through the total-reflecting surfaces S20 or S22 of the prisms 70 or 72 without being total-reflected, and then, the light comes to the negative end in the y-direction of each of the guide portions 46 and 48. At the negative ends in the y-direction of the guide portions 46 and 48, the connecting portion 52 and the reflector 60 are provided. By the connecting portion 52 and the reflector 60, the light coming to the negative ends in the y-direction of the guide portions 46 and 48 is turned back in the positive y-direction. The turned-back light is total-reflected to the reading position by the total-reflecting surfaces S21 and S23. Thus, in the light guide 42, light is used efficiently.

Further, while a user is operating the image reading apparatus 10, light emergent from the illuminating device 27 is unlikely to enter the user's eyes. FIG. 9 is a plan view of a major part of the image reading apparatus 10 when viewed from the x-direction.

As illustrated in FIG. 9, light emergent from the area A2 to the reading position travels in a direction slightly inclined to the negative side in the y-direction. Light emergent from the area A1 to the reading position travels in a direction slightly inclined to the positive side in the y-direction.

At this time, the user stands at the positive side in the y-direction of the image reading apparatus 10. The light emergent from the portion of the light guide 42 near the user (that is, the area A2) travels in a direction away from the user, and therefore, the light is unlikely to enter the user's eyes. Also, the area A1 is far away from the user, and the light emergent from the area A1 is unlikely to enter the user's eyes. Thus, while a user is operating the image reading apparatus 10, light emergent from the illuminating device 27 is unlikely to enter the user's eyes.

The angles α of the prisms 70 in the area A2 are greater than the angles β of the prisms 70 in the area A1. Therefore, the prisms 70 in the area A1 total-reflect light in a direction less inclined from the z-direction than the prisms 70 in the area A2.

Modifications

Figure 10A:
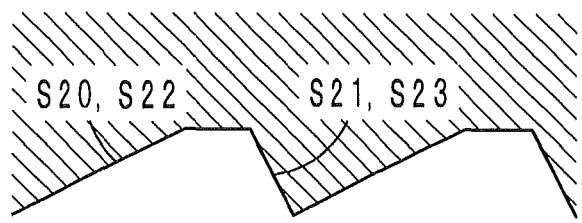
FIG. 10A is a plan view of prisms 70 and 72 according to a first modification when viewed from the x-direction.
Figure 10B:
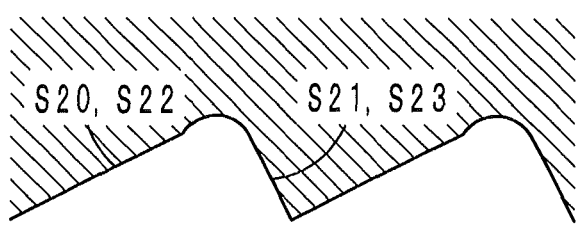
FIG. 10B is a plan view of prisms 70 and 72 according to a second modification when viewed from the x-direction.

Prisms 70 and 72 according to a couple of modifications are described below. FIG. 10A is a plan view of prisms 70 and 72 according to a first modification when viewed from the x-direction. FIG. 10B is a plan view of prisms 70 and 72 according to a second modification when viewed from the x-direction. FIGS. 10A and 10B illustrate the prisms 70 and 72 in the area A2.

As illustrated in FIG. 10A, each of the prisms 70 and 72 may include a surface that is parallel to the y-direction and connects its total-reflecting surfaces S20 and S21 or S22 and S23 to each other. In other words, each of the prisms 70 and 72 may be trapezoidal when viewed from the x-direction.

As illustrated in FIG. 10B, each of the prisms 70 and 72 may include a curved surface connecting its total-reflecting surfaces S20 and S21 or S22 and S23 to each other.

Other Embodiments

The light guide 42 of an illuminating device according to the present invention is not necessarily structured as described above, and modifications to the light guide 42 are possible without departing from the scope of the present invention.

The reflector 60 is not indispensable to the light guide 42.

The light guide 42 described above includes guide portions 46 and 48. However, the light guide 42 may include only one of the guide portions 46 and 48. In this case, the light guide 42 does not include the connecting portion 52, and therefore, the reflector 60 is indispensable.

The reflector 60 is not limited to a white sheet and may be a mirrored sheet.

Although the present invention has been described in connection with the preferred embodiments above, it is to be noted that various changes and modifications may be obvious to those who are skilled in the art. Such changes and modifications are to be understood as being within the scope of the present invention.

What is claimed is:

1. A light guide comprising:
a first guide portion extending in a first direction and configured to guide light entering thereto through a first end at a first side in the first direction to a reading position, the first guide portion including:

a plurality of first prisms provided on a first bottom surface of the first guide portion to be arranged in the first direction, the first bottom surface extending in the first direction, and configured to total-reflect light traveling in the first guide portion to the reading position; and a turn-back member configured to turn light coming to a second end of the first guide portion back in the first direction toward the first end, the second end located at a second side that is an opposite side in the first direction to the first side, wherein:

each of the first prisms includes a first total-reflecting surface facing to the first side in the first direction and a second total-reflecting surface facing to the second side in the first direction; and with respect to at least one of the first prisms located within an area extending parallel to the first direction from the second end of the first guide portion toward the first end by a first predetermined distance, an angle of the first total-reflecting surface to the first bottom surface is greater than an angle of the second total-reflecting surface to the first bottom surface.

2. The light guide according to claim 1, wherein with respect to at least one of the first prisms located within an area extending parallel to the first direction from the first end of the first guide portion toward the second end by a second predetermined distance, the angle of the second total-reflecting surface to the first bottom surface is greater than the angle of the first total-reflecting surface to the first bottom surface.

3. The light guide according to claim 2, wherein with respect to the at least one of the first prisms located within the area extending parallel to the first direction from the first end of the first guide portion toward the second end by the second predetermined distance, the first total-reflecting surface total-reflects light incident thereto from the first side, and the second total-reflecting surface transmits light incident thereto from the second side.

4. The light guide according to claim 1, wherein with respect to the at least one of the first prisms located within the area extending parallel to the first direction from the second end of the first guide portion toward the first end by the first predetermined distance, the first total-reflecting surface transmits light incident thereto from the first side, and the second total-reflecting surface total-reflects light incident thereto from the second side.

5. The light guide according to claim 1, wherein the at least one of the first prisms located within the area extending parallel to the first direction from the second end of the first guide portion toward the first end by the first predetermined distance fulfills:

$$2(\pi/2-\theta r-\beta) \leq \alpha \leq 2\theta r$$

wherein θr is a critical angle of a material of the first prisms, α is the angle of the first total-reflecting surface to the first bottom surface, and β is the angle of the second total-reflecting surface to the first bottom surface.

6. An illuminating device comprising the light guide according to claim 1.

7. An image reading apparatus comprising the illuminating device according to claim 6.

8. The image reading apparatus according to claim 7, wherein:

the illuminating device is configured to illuminate a document; and when a document having a readable maximum size in the first direction is set, the at least one of the first prisms located within the area parallel to the first direction from the second end of the first guide portion toward the first end by the first predetermined distance does not overlap with the document when viewed from a normal direction to the document.

9. The image reading apparatus according to claim 7, wherein a user stands at the first side in the first direction when the user operates the image reading apparatus.

10. A light guide comprising:

a first guide portion extending in a first direction and configured to guide light entering thereto through a first end thereof located at a first side in the first direction to a reading position, the first guide portion including a plurality of first prisms provided on a first bottom surface of the first guide portion to be arranged in the first direction, the first bottom surface extending in the first direction, and configured to total-reflect light traveling in the first guide portion to the reading position;

a second guide portion extending in the first direction and configured to guide light entering thereto through a third end thereof located at the first side in the first direction to the reading position, the second guide portion including a plurality of second prisms provided on a second bottom surface of the second guide portion to be arranged in the first direction, the second bottom surface extending in the first direction, and configured to total-reflect light traveling in the second guide portion to the reading position; and a turn-back member configured to guide light coming to a second end of the first guide portion to a fourth end of the second guide portion and to guide light coming to the fourth end of the second guide portion to the second end of the first guide portion, the second end and the fourth end located at a second side that is an opposite side in the first direction to the first side, wherein:

each of the first prisms includes a first total-reflecting surface facing to the first side in the first direction and a second total-reflecting surface facing to the second side in the first direction; and with respect to at least one of the first prisms located within an area extending parallel to the first direction from the second end of the first guide portion toward the first end by a first predetermined distance, an angle of the first total-reflecting surface to the first bottom surface is greater than an angle of the second total-reflecting surface to the first bottom surface.

11. The light guide according to claim 10, wherein with respect to at least one of the first prisms located within an area extending parallel to the first direction from the first end of the first guide portion toward the second end by a second predetermined distance, the angle of the second total-reflecting surface to the first bottom surface is greater than the angle of the first total-reflecting surface to the first bottom surface.

12. The light guide according to claim 11, wherein with respect to the at least one of the first prisms located within the area extending parallel to the first direction from the first end of the first guide portion toward the second end by the second predetermined distance, the first total-reflecting surface total-reflects light incident thereto from the first side, and the second total-reflecting surface transmits light incident thereto from the second side.

13. The light guide according to claim 10, wherein with respect to the at least one of the first prisms located within the area extending parallel to the first direction from the second end of the first guide portion toward the first end by the first predetermined distance, the first total-reflecting surface transmits light incident thereto from the first side, and the second total-reflecting surface total-reflects light incident thereto from the second side.

14. The light guide according to claim 10, wherein the at least one of the first prisms located within the area extending parallel to the first direction from the second end of the first guide portion toward the first end by the first predetermined distance fulfills:

$2(\pi/2-\theta r-\beta) \leq \alpha \leq 2\theta r$ wherein θr is a critical angle of a material of the first prisms, α is the angle of the first total-reflecting surface to the first bottom surface, and β is the angle of the second total-reflecting surface to the first bottom surface.

15. An illuminating device comprising the light guide according to claim 10.

16. An image reading apparatus comprising the illuminating device according to claim 15.

17. The image reading apparatus according to claim 16, wherein:
- the illuminating device is configured to illuminate a document; and
- when a document having a readable maximum size in the first direction is set, the at least one of the first prisms located within the area parallel to the first direction from the second end of the first guide portion toward the first end by the first predetermined distance does not overlap with the document when viewed from a normal direction to the document.

18. The image reading apparatus according to claim 16, wherein a user stands at the first side in the first direction when the user operates the image reading apparatus.

* * * * *